United States Patent Office 2,791,593
Patented May 7, 1957

2,791,593

PREPARATION OF 21-ACYLOXY-20-KETO-PREGNANES

Carl Djerassi, Birmingham, Mich., and Carl T. Lenk, Mexico City, Mexico

No Drawing. Application June 7, 1954,
Serial No. 435,084

Claims priority, application Mexico June 10, 1953

9 Claims. (Cl. 260—397.47)

The present invention relates to a novel method for the preparation of α-iodo-ketones. More particularly the present invention relates to the production of α-iodo-ketones and especially steroidal α-iodo-ketones by the reaction of the corresponding enol acetates with N-iodosuccinimide.

Steroidal α-iodo-ketones are important intermediate products for the manufacture of steroidal hormones since they may be readily converted into the corresponding α-acyloxy-ketones or α-hydroxy-ketones to which group belong important hormones such as the cortical hormone desoxycorticosterone. α-Iodo-ketones of this type have been prepared by previous methods such as those disclosed by Rosenkranz, Mancera, Gatica and Djerassi J. A. C. S. 72, 4077 (1950), or by the method of Ruschig (Angew. Chem., 60A, 247 (1948)).

In accordance with the present invention a new method for the preparation of such α-iodo-ketones has been provided, namely the reaction of an enol acetate with N-iodosuccinimide. Surprisingly, N-iodosuccinimide reacts selectively with double bonds of the enolic type leaving intact other double bonds which may be present in the molecule. This selective property of N-iodosuccinimide is especially surprising since its bromo analogue, namely N-bromosuccinimide reacts with isolated double bonds present in the steroidal molecule.

The following equation serves to illustrate the process of the present invention:

$$R-C=C-R_2 \xrightarrow{\text{N-iodosuccinimide}} R-C-C-R_2$$
$$\phantom{R-C=}OR_1 \phantom{\xrightarrow{\text{N-iodosuccinimide}}} \phantom{R-C-}I \phantom{-}O$$

R may be hydrogen or R and $R_2$ together may represent two of the carbon atoms of a carbo cyclic compound such as a steroid nucleus. Further, if R is hydrogen, then $R_2$ may represent an organic radical preferably a saturated or unsaturated steroid nucleus. In such case the nucleus may contain additional double bonds in various positions such as between C—16 and C—17 and/or between C—5 and C—6 or the nucleus may contain an aromatic ring A. The steroid nucleus may be substituted in various positions such as by an esterified hydroxy group in the 3-position. $R_1$ represents a lower fatty and acid acyl group.

The present method is especially suitable therefore for the production of compounds of the pregnane series such as desoxycorticosterone from pregnenolone or from 16-dehydropregnenolone according to the following equation:

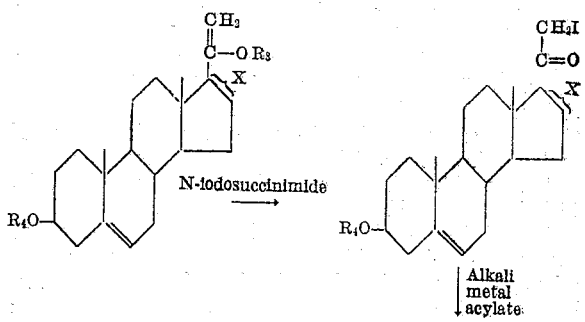

↓ Alkali metal acylate

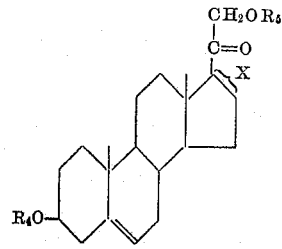

In the above equation $R_3$ represents an acyl group preferably that derived from a lower fatty acid, i. e. an aliphatic acid of less than 7 carbon atoms, such as acetic. $R_4$ represents any acyl group derived from acid radicals commonly used for the esterification of steroid alcohols and especially the lower fatty acids such as acetic or propionic or an aromatic acid such as benzoic. $R_5$ represents a lower fatty acid acyl or a benzoyl group. This ester grouping in the 21 position may be derived by reaction with an alkali metal lower fatty acid acylate or the corresponding benzoate.

X in the above equation is intended to represent either a saturated linkage between C—16 and C—17 or a double bond in this position. In the event X represents a double bond the final compound represented above may be saturated preferentially by catalytic hydrogenation to give the 16—17 saturated compound. An especially desirable group of esters are those wherein $R_4$ represents the residue of formic acid since these compounds on treatment with an Oppenauer reagent may be directly oxidized to a $\Delta^4$-3-keto compound. This reaction is disclosed in United States Application Serial No. 401,058, filed December 29, 1953.

Thus there may be produced from the 3-formate,21-acetate of $\Delta^5$-pregnen-3,21-diol-20-one, the acetate of desoxycorticosterone.

The reaction above outlined is also applicable to steroidal compounds having an aromatic ring A.

In practicing the invention according to the above equations the enol acylate which is preferably an acylate of a lower fatty acid is dissolved in an organic solvent and heated for a short time, as for example 45 minutes, with N-iodosuccinimide. The iodo-ketone is then isolated and/or purified. Thereafter the iodo-ketone may be further treated as for example by reaction with an alkali metal salt of a lower fatty acid or benzoic acid to prepare the corresponding acylate. Suitable alkali metal salts of this character are potassium acetate or potassium benzoate.

The following specific examples serve to illustrate but are not intended to limit the present invention:

EXAMPLE I

Preparation of N-iodosuccinimide $(C_4H_4O_2IN)$ 510 g. of recently precipitated silver oxide was added to a solution of 392 g. of succinimide in 12 l. of boiling water. The mixture was filtered and the silver salt was allowed to crystallize. Filtration and several washings with cold water yielded 450 g. of the silver salt of succinimide appropriate to be used in the next iodination step. 49.5 g. of this finely powdered salt was added in small portions and under continuous stirring to a solution of 50.8 g. of iodine in 300 cc. of acetone, keeping the temperature between 5 and 10° C. After the solution has decolorized (30 minutes) the silver iodide was filtered, the solvent was evaporated under reduced pressure at room temperature and the residue was washed with ether, thus giving 43 g. of N-iodosuccinimide with a melting point of 189°–191° C. The analytical sample was obtained by recrystallization from hexane-carbon tetrachloride; it had a melting point of 200°–201° C. In the following examples the N-iodosuccinimide used had a melting point not less than 197° C.

EXAMPLE II 2 g. of the diacetate of $\Delta^{5,20}$-pregnadiene-3$\beta$,20-diol (prepared according to Moffett and Weisblat, JACS, 74, 2183 (1952)) was dissolved in 2 cc. of pure dioxane and the solution was heated for 45 minutes at 85° C. with 1.18 g. of N-iodosuccinimide. The cooled dark red solution was mixed with potassium iodide solution and then with sodium thiosulfate and much water. The precipitate was filtered, washed with water and crystallized from methanol-water, thus yielding 1.31 g. of the iodoketone having a melting point of 135°–137° C. The analytical sample had a melting point of 140°–141° C., $[\alpha]_D$ +63°.

The acetolysis of the above compound in accordance with the method of Rosenkranz et al., JACS, 72, 4084 (1950) afforded the diacetate of $\Delta^5$-pregnene-3$\beta$,21-diol-20-one with a melting point of 166°–167° C., the identity of which was proved by direct comparison with an authentic sample.

EXAMPLE III 4.3 g. of the acetate of $\Delta^2$-cholesten-3-ol was treated with 2.3 g. of N-iodosuccinimide in accordance with the method described in Example II, to yield 3.9 g. of the 2-iodo-cholestan-3-one having a melting point of 125°–127° C. (decomposition), identical to the one described by Rosenkranz, Mancera, Gatica and Djerassi (JACS, 72, 4079 (1950)).

EXAMPLE IV 5 g. of the diacetate of $\Delta^{5,16,20}$-pregnatriene-3$\beta$,20-diol (melting point 144°–146° C.; obtained in accordance with the method of Moffett and Weisblat JACS, 74, 2183 (1952)) was heated for 50 minutes at 85° C. with 3.09 g. of N-iodosuccinimide in 10 cc. of dioxane. After cooling the solution, methanol was added and then mixed with potassium iodide solution. It was then decolorized with sodium thiosulfate in an excess of water. The precipitate was filtered, washed with much water and crystallized from methanol. The colorless iodo compound was dried at 75° (without the use of vacuum), thus giving 5.5 g. of the acetate of 21-iodo-$\Delta^{5,16}$-pregnadien-3$\beta$-ol-20-one having a melting point of 153°–155° C. This compound showed an ultraviolet absorption maximum at 249 m$\mu$.

5.35 g. of the above 21-iodo compound was refluxed for 12 hours in 100 cc. of acetone with a mixture prepared by grinding 15 g. of potassium bicarbonate with 9.5 cc. of acetic acid. Dilution with water and filtration afforded the crude compound which upon crystallization from methanol gave 4.25 g. of the diacetate of $\Delta^{5,16}$-pregnadiene-3$\beta$,21-diol-20-one with a melting point of 152°–153° C. The analytical sample had a melting point of 154°–155° C. and selective ultraviolet absorption at 241 m$\mu$.

1 g. of the diacetate of $\Delta^{5,16}$-pregnadiene-3$\beta$,21-diol-20-one dissolved in 40 cc. of ethyl acetate was hydrogenated at a temperature of 50° C. and under a pressure of five pounds for 40 minutes in the presence of 500 mg. of a palladium on barium sulfate catalyst. The catalyst was removed by filtration and the solution was evaporated to dryness. The residue crystallized from ethyl acetate to give 0.87 g. of the diacetate of $\Delta^5$-pregnene-3$\beta$,21-diol-20-one with a melting point of 166°–168° C., $[\alpha]_D$ +32° (ethanol), identical to the one obtained in accordance with Example II.

EXAMPLE V 5 g. of $\Delta^{5,16}$-pregnadien-3$\beta$-ol-20-one was dissolved in 70 cc. of formic acid and the solution was heated at 80° C. for one hour. It was then poured into water and the precipitate was filtered and washed with water. The precipitate was crystallized from chloroform-methanol, thus giving 4.7 g. of the 3-formate. Its analytical sample had a melting point of 175°–177° C., $[\alpha]_D$ −42° (chloroform). The substance showed an ultraviolet absorption maximum at 238 m$\mu$ (log E 4.15).

20 g. of the formate was dissolved in 400 cc. of isopropenyl acetate and after adding 3 g. of p-toluenesulfonic acid the solution was slowly concentrated in the course of 10 hours to one-half of its original volume. The cooled mixture was diluted with ether and the ether solution was washed with saturated sodium bicarbonate solution and water, dried over sodium sulfate and evaporated to dryness under reduced pressure. The residue was digested with hexane, thus giving 12.2 g. of the 3-formate 20-acetate of $\Delta^{5,16,20}$-pregnatriene-3$\beta$-20-diol. Crystallization from acetone-hexane gave the analytical sample with a melting point of 140°–142° C., $[\alpha]_D$ −62° (chloroform), $\lambda$ max. 238 m$\mu$ (log E 4.28).

EXAMPLE VI 10 g. of the 3-formate 20-acetate obtained in accordance with Example V (melting point 133°–135° C.) was dissolved in 25 cc. of dioxane, 7 g. of N-iodosuccinimide of a melting point of 200°–203° C. was added and the mixture was heated for one hour at 80° C. It was then poured, under stirring, into ice water containing 3 g. of sodium thiosulfate. The precipitate was filtered, washed and recrystallized from chloroform-methanol to give 9 g. of the 21-iodo compound with a melting point of 140°–142° C. (dec.) $[\alpha]_D$ −48° (chloroform), $\lambda$ max. 250 m$\mu$ (log E 4.0).

10 g. of the formate of 21-iodo-$\Delta^{5,16}$-pregnadien-3$\beta$-ol-20-one dissolved in 300 cc. of acetone was refluxed with potassium acetate (prepared by mixing 12 g. of acetic acid with 20 g. of potassium bicarbonate) for 10 hours. The mixture was poured into ice water and the precipitate was filtered. Recrystallization from chloroform-methanol afforded 7.5 g. of the 3-formate 21-acetate of $\Delta^{5,16}$-pregnadiene-3$\beta$,21-diol-20-one with a melting point of 158°–160° C. The analytical sample had a melting point of 163°–165° C., $[\alpha]_D$ −35° (chloroform), $\lambda$ max. 240 m$\mu$ (log E 4.15).

EXAMPLE VII 10 g. of the formate of 21-iodo-$\Delta^{5,16}$-pregnadien-3$\beta$-ol-20-one in 400 cc. of acetone was refluxed for 15 hours with 10 g. of potassium benzoate (alternatively, the operation can be carried out refluxing in an alcoholic solvent, such as methanol or ethanol, for 8 hours). After pouring into ice water, the precipitate was filtered. Recrystallization from chloroform-methanol yielded 4.3 g. of the 3-formate 21-benzoate of $\Delta^{5,16}$-pregnadiene-3$\beta$-21-diol-20-one.

EXAMPLE VIII

A solution of 10 g. of 3-hydroxy-17-acetyl-1,3,5(10), 16-estratetraene in 200 cc. of isopropenyl acetate was boiled with 1.5 g. of p-toluenesulfonic acid monohydrate, maintaining a slow distillation for 10 hours. During this time the volume of the solution was kept constant by the addition from time to time of additional amounts of isopropenyl acetate. The cooled solution was mixed with 10 g. of solid sodium bicarbonate, filtered and the isopropenyl acetate was evaporated under reduced pressure. The residue was crystallized from ether and then from hexane, thus yielding 6.5 g. of the diacetate of the $\Delta^{20}$-enol with melting point of 156°–159° C.

5 g. of the diacetate thus obtained was dissolved in 12 cc. of dioxane and mixed with 3.5 g. of N-iodosuccinimide. The mixture was heated for one hour at 80° C. and then poured into ice water containing 1.6 g. of sodium thiosulphate. The precipitate was filtered, washed and recrystallized from methanol, thus giving 4.4 g. of the 21-iodo compound having a melting point of 159°–161° C.

4 g. of the 21-iodo compound dissolved in 125 cc. of acetone was mixed with potassium acetate (prepared by mixing 4 g. of acetic acid and 6.6 g. of potassium bicarbonate) and the solution was refluxed for 10 hours. It was then poured into ice water and the precipitate was filtered. Recrystallization from methanol afforded 3 g. of the diacetate of 3-hydroxy-17-(hydroxy-acetyl)-1,3,5(10),16-estratetraene with a melting point of 141°–142° C.

EXAMPLE IX

A mixture of 0.25 g. of the 3,21-diacetate obtained in accordance with Example VIII, 75 mg. of a palladium on barium sulfate catalysts and 25 cc. of ethyl acetate was hydrogenated for one hour under an atmosphere of hydrogen and at a temperature of 50° C. The catalyst was filtered, the solution was evaporated to dryness and the residue crystallized from methanol, thus giving 200 mg. of the diacetate of 3-hydroxy-17$\beta$-(hydroxyacetyl)-1,3,5(10)-estratriene having a melting point of 124°–125° C.

We claim:

1. A method for the preparation of pregnane 21-iodo-20-ketones which comprises reacting the corresponding $\Delta^{20}$-20-lower fatty acyloxy compounds with N-iodosuccinimide.

2. The method of claim 1 wherein the pregnane 21-iodo-20-ketone is additionally unsaturated and the N-iodosuccinimide selectively reacts with the enolic double bond.

3. A method for the preparation of pregnane $\Delta^{16}$-21-iodo-20-ketones which comprises reacting the corresponding $\Delta^{16,20}$-diene-20-acyloxy compounds with N-iodosuccinimide.

4. A method for the production of pregnane $\Delta^{16}$-21-acyloxy-20-ketones which comprises reacting the corresponding $\Delta^{16,20}$-diene-20-acyloxy compounds with N-iodosuccinimide to prepare the corresponding steroidal $\Delta^{16}$-21-iodo-20-ketones and reacting the last mentioned ketones with an alkali metal acylate.

5. A method for the preparation of pregnane 21-acyloxy-20-ketones which comprises reacting a corresponding $\Delta^{16,20}$-diene-20-acyloxy compound with N-iodosuccinimide to prepare the corresponding $\Delta^{16}$-21-iodo-20-ketone, reacting the last mentioned ketone with an alkali metal acylate to form a corresponding $\Delta^{16}$-21-acyloxy-20-ketone and hydrogenating in the presence of a catalyst the last mentioned compound to saturate the $\Delta^{16}$ double bond.

6. A method for the preparation of the diester of $\Delta^{5,16}$-pregnadiene-3$\beta$,21-diol-20-one which comprises reacting the diester of $\Delta^{5,16,20}$-pregnatriene-3$\beta$,20-diol with N-iodosuccinimide and thereafter reacting the ester of 21-iodo-$\Delta^{5,16}$-pregnadiene-3$\beta$-ol-20-one formed with an alkali metal acylate.

7. The process of claim 6 wherein the alkali metal acylate is selected from the group consisting of alkali metal lower fatty acylates and alkali metal benzoate.

8. The process of claim 7 wherein the diester prepared is a 3-formate 21-acetate and the alkali metal acylate is potassium acetate.

9. The process of claim 7 wherein the diester prepared is a 3-formate 21-benzoate and the alkali metal acylate is potassium benzoate.

References Cited in the file of this patent

UNITED STATES PATENTS

| 2,359,772 | Marker | Oct. 10, 1944 |
| 2,409,043 | Inhoffen | Oct. 8, 1946 |
| 2,595,596 | Moffett | May 6, 1952 |

FOREIGN PATENTS

| 897,704 | Germany | Nov. 23, 1953 |
| 1,060,639 | France | Nov. 18, 1953 |